United States Patent [19]
Bahl et al.

[11] Patent Number: 5,276,766
[45] Date of Patent: Jan. 4, 1994

[54] FAST ALGORITHM FOR DERIVING ACOUSTIC PROTOTYPES FOR AUTOMATIC SPEECH RECOGNITION

[75] Inventors: Lalit R. Bahl, Amawalk; Jerome R. Bellegarda, Goldens Bridge; Peter V. DeSouza, Mahopac Falls; David Nahamoo; Michael A. Picheny, both of White Plains, all of N.Y.

[73] Assignee: International Business Machines Corporation, Armonk, N.Y.

[21] Appl. No.: 730,714

[22] Filed: Jul. 16, 1991

[51] Int. Cl.$^5$ .............................................. G10L 9/04
[52] U.S. Cl. .................................................. 395/2.65
[58] Field of Search .................................. 381/41–45 395/2.65

[56] References Cited

U.S. PATENT DOCUMENTS

| | | | |
|---|---|---|---|
| 4,587,670 | 5/1986 | Levinson et al. | 381/43 |
| 4,741,036 | 4/1988 | Bahl et al. | 381/43 |
| 4,759,068 | 7/1988 | Bahl et al. | 381/43 |
| 4,903,305 | 2/1990 | Gillick et al. | 381/41 |
| 5,129,001 | 7/1992 | Bahl et al. | 381/43 |
| 5,182,773 | 1/1993 | Bahl et al. | 381/43 |

OTHER PUBLICATIONS

Bahl, L. R., et al., "A Maximum Likelihood Approach to Continuous Speech Recognition" IEEE Transactions on Pattern Analysis and Machine Intelligence, vol. PAMI-5, No. 2, pp. 179–190, Mar. 1983.
Jelinek, R., "Continuous Speech Recognition By Statistical Methods", Proceedsing of the IEEE, vol. 64, No. 4, pp. 532–556, Apr. 1976.
Jelink, F. "The Development of An Experimental Discrete Dictation Recognizer" Proceedings of the IEEE, vol. 73, No. 11, Nov., 1985, pp. 1616–1624.
Bahl, L. R., et al., "Acoustic Markov Models Used in the Tangora Speech Recognition System" Proceedings 1988 International Conference on Acoustics, Speech and Signal Processing, New York, N.Y., Apr. 1988, pp. 497–500.
Nadas, A., et al., "Continuous Speech Recognition With Automatically Selected Prototypes Obtained By Either Bootstrapping Or Clustering" Proceedings 1981 International Conference on Acoustics, Speech, and Signal Processing, Atlanta, Ga., Apr. 1981, pp. 1153–1155.

Primary Examiner—Michael R. Fleming
Assistant Examiner—Michelle Doerrler
Attorney, Agent, or Firm—Marc D. Schechter

[57] ABSTRACT

An apparatus for generating a set of acoustic prototype signals for encoding speech includes a memory for storing a training script model comprising a series of word-segment models. Each word-segment model comprises a series of elementary models. An acoustic measure is provided for measuring the value of at least one feature of an utterance of the training script during each of a series of time intervals to produce a series of feature vector signals representing the feature values of the utterance. An acoustic matcher is provided for estimating at least one path through the training script model which would produce the entire series of measured feature vector signals. From the estimated path, the elementary model in the training script model which would produce each feature vector signal is estimated. The apparatus further comprises a cluster processor for clustering the feature vector signals into a plurality of clusters. Each feature vector signal in a cluster corresponds to a single elementary model in a single location in a single word-segment model. Each cluster signal has a cluster value equal to an average of the feature values of all feature vectors in the signal. Finally, the apparatus includes a memory for storing a plurality of prototype vector signals. Each prototype vector signal corresponds to an elementary model, has an identifier, and comprises at least two partition values. The partition values are equal to combinations of the cluster values of one or more cluster signals corresponding to the elementary model.

14 Claims, 1 Drawing Sheet

FAST ALGORITHM FOR DERIVING ACOUSTIC PROTOTYPES FOR AUTOMATIC SPEECH RECOGNITION

BACKGROUND OF THE INVENTION

The invention relates to an apparatus and method for speech encoding, and to a speech recognition apparatus which contains such a speech encoding apparatus.

In an automatic speech recognition system, the acoustic features of an utterance to be recognized are measured, and are compared to acoustic models of each of a plurality of speech symbols, such as words or parts of words. In one known approach, the measured acoustic features of the utterance are encoded with acoustic prototypes from a library of acoustic prototypes, in order to simplify the comparison of the acoustic features of the utterance with the acoustic model of each word. Two known methods of encoding measured acoustic features with acoustic prototypes are described in an article entitled "Continuous Speech Recognition with Automatically Selected Acoustic Prototypes Obtained By Either Bootstrapping Or Clustering" by A. Nadas, et al (*Proceedings ICASSP* 1981, pages 1153-1155, April 1981).

The performance of the speech recognition system is dependent, in part, on the adequacy of the acoustic prototypes in the acoustic prototype library. This is especially true for continuous speech recognition tasks where coarticulation effects may be numerous.

SUMMARY OF THE INVENTION

It is an object of the invention to generate an improved set of acoustic prototypes for encoding speech.

It is another object of the invention to provide a speech recognition apparatus containing an improved set of acoustic prototypes for encoding speech so as to improve the recognition accuracy of the apparatus.

It is a further object of the invention to generate a set of acoustic prototypes for encoding speech, which acoustic prototypes can be generated quickly.

According to the invention, an apparatus for generating a set of acoustic prototype signals for encoding speech comprises means for storing a model of a training script. The training script model comprises a series of word-segment models selected from a finite set of word-segment models. Each word-segment model comprises a series of elementary models. Each elementary model has a location in each word-segment model, and is selected from a finite set of elementary models.

The acoustic prototype generating apparatus further includes means for measuring the value of at least one feature of an utterance of the training script during each of a series of time intervals spanned by the utterance of the training script to produce a series of feature vector signals. Each feature vector signal represents the value of the at least one feature of the utterance during a corresponding time interval. Means are provided for estimating at least one path through the training script model which would produce the entire series of measured feature vector signals so as to estimate, for each feature vector signal, the corresponding elementary model in the training script model which would produce that feature vector signal.

The apparatus also includes means for clustering the feature vector signals into a plurality of clusters to form a plurality of cluster signals. Each feature vector signal in a cluster corresponds to a single elementary model in a single location in a single word-segment model. Each cluster signal has a cluster value equal to an average of the feature values of all of the feature vectors in the clusters.

Means are provided for storing a plurality of prototype vector signals. Each prototype vector signal corresponds to an elementary model, has an identifier, and comprises at least two partition values (sub-prototype vectors). At least one partition value is equal to a combination of the cluster values of one or more cluster signals corresponding to the elementary model. At least one other partition value is equal to a combination of the feature values of one or more other cluster signals corresponding to the elementary model.

In one aspect of the invention, the estimating means comprises means for estimating the most likely path through the training script model which would product the entire series of measured feature vector signals. For each feature vector signal, the corresponding elementary model in the training script model which would most likely produce that feature vector signal is estimated.

Typically, at least two different word-segment models will contain at least one elementary model which is the same in both word-segment models. Moreover, there may be one or more word-segment models which contain the same elementary model in at least two different locations in the word-segment model.

In another aspect of the invention, each cluster signal has a cluster value equal to the average of the feature values of all of the feature vectors in a cluster, and equal to the variance of the feature values of all of the feature vectors in the cluster.

In the method of generating a set of acoustic prototype signals for encoding speech according to the present invention, a model of a training script is stored. The training script model comprises a series of word-segment models, where each word-segment model comprises a series of elementary models. The value of at least one feature of an utterance of the training script is measured to produce a series of feature vector signals representing the value of the at least one feature of the utterance during a corresponding time interval. At least one path through the training script model estimated which would produce the entire series of measured feature vector signals so as to estimate, for each feature vector signal, the corresponding elementary model in the training script model which would produce that feature vector signal.

The feature vector signals are then clustered into a plurality of clusters. Each feature vector signal in a cluster corresponds to a single elementary model in a single location in a single word-segment model. Each cluster signal has a cluster value equal to an average of the feature values of all of the feature vectors in the cluster. A plurality of prototype vector signals, each corresponding to an elementary model, are then stored. Each prototype vector signal has an identifier and comprises at least two partition values equal to a combination of the cluster values of one or more cluster signals corresponding to the elementary model.

A speech recognition apparatus according to the present invention comprises means for measuring the value of at least one feature of an utterance of a word to be recognized during each of a series of time intervals spanned by the utterance of the word to be recognized to produce a series of feature vector signals. Each feature vector signal represents the value of the at least one feature of the utterance during a corresponding time interval. Means are provided for storing a set of a plurality of prototype vector signals, each prototype vector signal having an identifier and a prototype value.

The apparatus further includes means for comparing the value of each feature vector signal to the value of each prototype vector signal to identify the best matched prototype vector signal associated with each feature vector signal to produce a series of associated prototype vector identifier signals.

The speech recognition apparatus also comprises means for storing a plurality of acoustic word models. Means are provided for comparing the series of prototype vector identifier signals with each of the acoustic word models to estimate the one or more words which most likely correspond to the series of prototype vector identifier signals. Finally, the speech recognition apparatus includes means, according to the present invention, for generating the set of acoustic prototype signals for encoding speech.

The method of generating a set of acoustic prototype signals for encoding speech according to the present invention may be performed by a machine such as a general purpose digital computer containing hardware for measuring acoustic features. Accordingly, the present invention also includes an apparatus for configuring a machine to perform the method of generating a set of acoustic prototype signals according to the present invention. Such a machine-configuring apparatus may be, for example, a storage medium containing a computer program recorded thereon.

The apparatus and method according to the present invention are advantageous because they provide a relatively fast method of generating a set of acoustic prototype signals for encoding speech, while maintaining or improving the recognition accuracy of a speech recognition system using the set of acoustic prototype signals.

DESCRIPTION OF THE PREFERRED EMBODIMENTS

Figure 1:
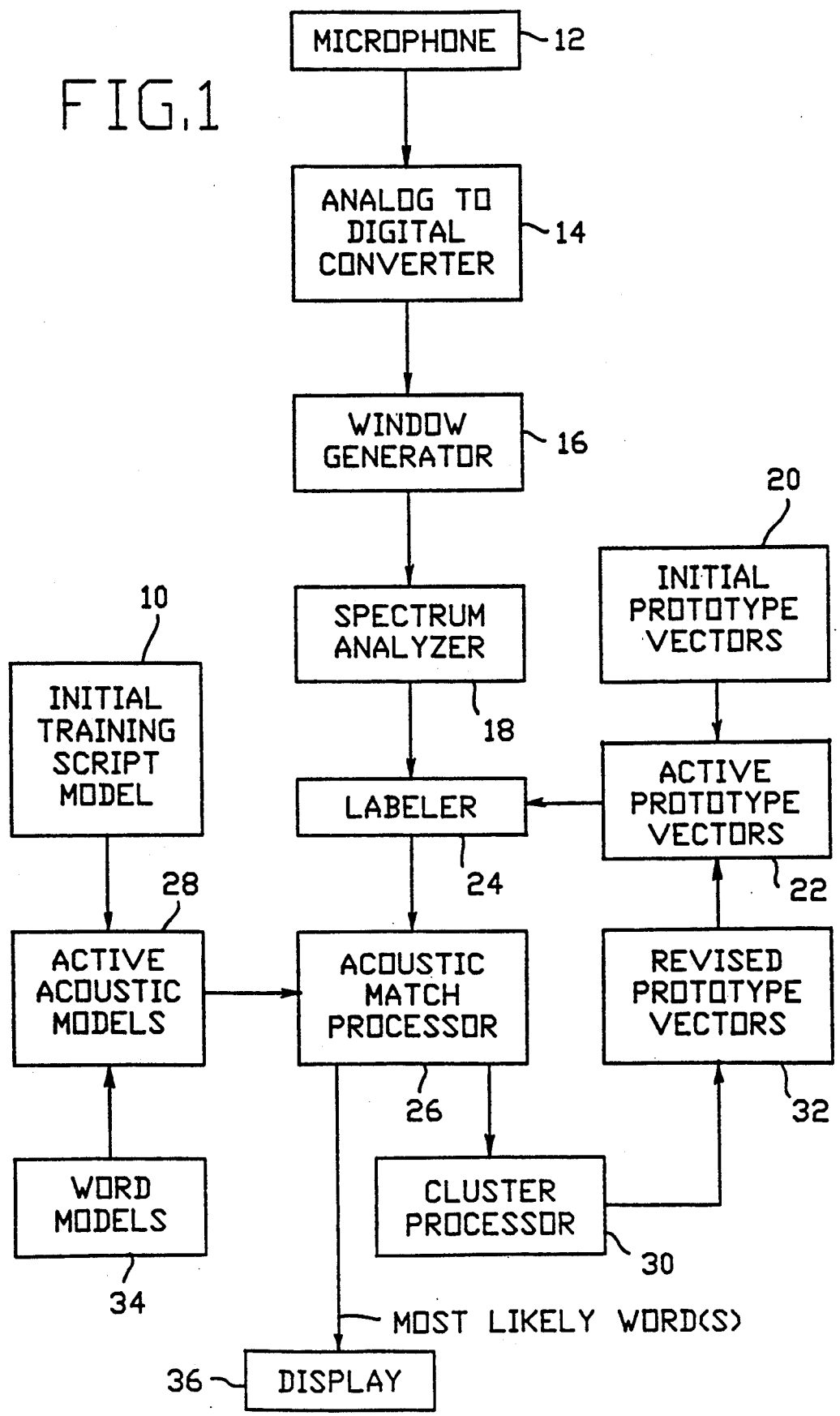
FIG. 1 is a block diagram of a speech recognition apparatus, including an apparatus for generating a set of acoustic prototype signals for encoding speech.

FIG. 1 is a block diagram of a speech recognition apparatus which includes an apparatus for generating a set of acoustic prototype signals for encoding speech. The apparatus includes means 10 for storing a model of a training script. The training script model comprises a series of word-segment models. In a hypothetical example, the model of the training script may comprise the series of word-segment models W1, W14, W1, W5, W18 and W9.

Each word-segment model comprises a series of elementary models. Each elementary model has a location in each word-segment model. Each elementary model is selected from a finite set of elementary models.

The hypothetical word-segment models described above may, for example, consist of hypothetical elementary models M1, M4, M5, M9, and M20, in locations L1, L2, L3, and L4 of the word-segment models as shown in Table 1.

TABLE 1

| Word Segment Model | Elementary Model Location | | | |
|---|---|---|---|---|
| | L1 | L2 | L3 | L4 |
| W1 | M5 | M1 | M4 | |
| W5 | M1 | M4 | M5 | |
| W9 | M4 | M5 | M1 | |
| W14 | M20 | M9 | M20 | M5 |
| W18 | M20 | M5 | M9 | M20 |

The apparatus for generating a set of acoustic prototype signals further includes means for measuring the value of at least one feature of an utterance of the training script during each of a series of time intervals spanned by the utterance of the training script to produce a series of feature vector signals. Each feature vector signal represents the value of the at least one feature of the utterance during a corresponding time interval.

The means for measuring the values of at least one feature of an utterance comprises, for example, a microphone 12, an analog to digital converter 14, a window generator 16 and a spectrum analyzer 18. The microphone 12 generates an analog electrical signal corresponding to the utterance. The analog electrical signal from microphone 12 is converted to a digital electrical signal by analog to digital converter 14. For this purpose, the analog signal may be sampled, for example, at a rate of 20 kilohertz by the analog to digital converter 14.

Window generator 16 obtains, for example, a 20 millisecond sample of the digital signal from analog to digital converter 14 every 10 milliseconds (one centisecond). Each 20 millisecond sample of the digital signal is analyzed by spectrum analyzer 18 in order to obtain the amplitude of the digital signal sample in each of, for example, 20 frequency bands. The spectrum analyzer 18 may be, for example, a fast Fourier transform processor. Alternatively, it may be a bank of 20 band pass filters. Window generator 16 and spectrum analyzer 18 may be suitably programmed special purpose or general purpose digital signal processors.

As described above, it is preferable to measure the value of at least 20 features of an utterance during each 10 millisecond time interval, where each feature is the amplitude of the utterance in a selected frequency band. However, for the purpose of illustrating the present invention, in the hypothetical example described below only one feature is measured during each time interval.

The apparatus for generating a set of acoustic prototype signals further includes means for estimating one path through the training script model which would produce the entire series of measured feature vector signals so as to estimate, for each feature vector signal, the corresponding elementary model in the training script model which would produce that feature vector signal.

Referring to FIG. 1, the path-estimating means may comprise, for example, an initial prototype vector store 20, an active prototype vector store 22, a labeller 24, an acoustic match processor 26, initial training script model store 10, and an active acoustic model store 28. The initial prototype vectors in store 20 may be obtained, for example, by any of the known methods described in the article by A. Nadas, et al, described above. The initial prototype vectors are copied into the active prototype vector store 22 so that labeller 24 can compare the value of each feature vector signal to the value of each prototype vector signal to identify the best matched prototype vector signal associated with each feature vector signal to produce a series of associated prototype identifier signals.

The initial training script model in store 10 copied into active acoustic model store 28 so that acoustic match processor 26 can estimate at least one path through the training script model which would produce the entire series of measured feature vector signals so as to estimate, for each feature vector signal, the corresponding elementary model in the training script model which would produce that feature vector signal.

Preferably, the acoustic match processor 26 estimates the most likely path through the training script model which would produce the entire series of measured feature vector signals so as to estimate, for each feature vector signal, the corresponding elementary model in the training script model which would most likely produce that feature vector signal. The most likely path can be found by the acoustic match processor 26 by performing, for example, the known Viterbi algorithm, such as described in an article entitled "Continuous Speech Recognition by Statistical Methods" by F. Jelinek (*Proceedings of the IEEE*, Volume 64, No. 4, pages 532–556, April 1976).

In the hypothetical example illustrating the present invention, Table 2 shows a series of time intervals 1 through 34 spanned by the utterance of the training script. Acoustic feature vectors represent the hypothetical values of the measured feature of the utterance during each time interval. For each acoustic feature vector in Table 2, a hypothetical elementary model corresponds thereto. Finally, as shown in Table 2, each elementary model is identified with the word-segment model of the training script model in which the elementary model occurs, and is identified with the location (see Table 1, above) of the elementary model in the word-segment model.

TABLE 2

| Time | Acoustic Feature Vector | Elementary Model | Word Segment Model | Location |
| --- | --- | --- | --- | --- |
| 1 | 20 | M5 | W1 | L1 |

TABLE 2-continued

| Time | Acoustic Feature Vector | Elementary Model | Word Segment Model | Location |
| --- | --- | --- | --- | --- |
| 2 | 24 | M5 | W1 | L1 |
| 3 | 9 | M1 | W1 | L2 |
| 4 | 7 | M1 | W1 | L2 |
| 5 | 10 | M1 | W1 | L2 |
| 6 | 15 | M4 | W1 | L3 |
| 7 | 16 | M4 | W1 | L3 |
| 8 | 67 | M20 | W14 | L1 |
| 9 | 44 | M9 | W14 | L2 |
| 10 | 48 | M9 | W14 | L2 |
| 11 | 69 | M20 | W14 | L3 |
| 12 | 28 | M5 | W14 | L4 |
| 13 | 32 | M5 | W14 | L4 |
| 14 | 16 | M5 | W1 | L1 |
| 15 | 8 | M1 | W1 | L2 |
| 16 | 11 | M1 | W1 | L2 |
| 17 | 14 | M4 | W1 | L3 |
| 18 | 9 | M1 | W5 | L1 |
| 19 | 7 | M1 | W5 | L1 |
| 20 | 10 | M1 | W5 | L1 |
| 21 | 15 | M4 | W5 | L2 |
| 22 | 16 | M4 | W5 | L2 |
| 23 | 20 | M5 | W5 | L3 |
| 24 | 24 | M5 | W5 | L3 |
| 25 | 72 | M20 | W18 | L1 |
| 26 | 28 | M5 | W18 | L2 |
| 27 | 32 | M5 | W18 | L2 |
| 28 | 44 | M9 | W18 | L3 |
| 29 | 50 | M9 | W18 | L3 |
| 30 | 70 | M20 | W18 | L4 |
| 31 | 14 | M4 | W9 | L1 |
| 32 | 16 | M5 | W9 | L2 |
| 33 | 8 | M1 | W9 | L3 |
| 34 | 11 | M1 | W9 | L3 |

The acoustic prototype generating apparatus further includes means for clustering the feature vector signals into a plurality of clusters to form a plurality of cluster signals. Each feature vector signal in a cluster corresponds to a single elementary model in a single location in a single word-segment model. Each cluster signal has a value equal to an average of the feature values of all of the feature vectors in the cluster.

The clustering means may comprise a cluster processor 30 as shown in FIG. 1. Table 3–7 illustrate a hypothetical example of the clustering performed by cluster processor 30.

TABLE 3

| Time | Acoustic Feature Vector | Elementary Model | Word Segment Model | Location | Cluster Value |
| --- | --- | --- | --- | --- | --- |
| 3 | 9 | M1 | W1 | L2 | C(M1, W1, L2) = 9 |
| 4 | 7 | M1 | W1 | L2 | |
| 5 | 10 | M1 | W1 | L2 | |
| 15 | 8 | M1 | W1 | L2 | |
| 16 | 11 | M1 | W1 | L2 | |
| 18 | 9 | M1 | W5 | L1 | C(M1, W5, L1) = 8.67 |
| 19 | 7 | M1 | W5 | L1 | |
| 20 | 10 | M1 | W5 | L1 | |
| 33 | 8 | M1 | W9 | L3 | C(M1, W9, L3) = 9.5 |
| 34 | 11 | M1 | W9 | L3 | |

TABLE 4

| Time | Acoustic Feature Vector | Elementary Model | Word Segment Model | Location | Cluster Value |
| --- | --- | --- | --- | --- | --- |
| 6 | 15 | M4 | W1 | L3 | C(M4, W1, L3) = 15 |
| 7 | 16 | M4 | W1 | L3 | |
| 17 | 14 | M4 | W1 | L3 | |
| 21 | 15 | M4 | W5 | L2 | C(M4, W5, L2) = 15.5 |
| 22 | 16 | M4 | W5 | L2 | |

TABLE 4-continued

| Time | Acoustic Feature Vector | Elementary Model | Word Segment Model | Location | Cluster Value |
| --- | --- | --- | --- | --- | --- |
| 31 | 14 | M4 | W9 | L1 | C(M4, W9, L1) = 14 |

TABLE 5

| Time | Acoustic Feature Vector | Elementary Model | Word Segment Model | Location | Cluster Value |
| --- | --- | --- | --- | --- | --- |
| 1 | 20 | M5 | W1 | L1 | C(M5, W1, L1) = 20 |
| 2 | 24 | M5 | W1 | L1 | |
| 14 | 16 | M5 | W1 | L1 | |
| 12 | 28 | M5 | W14 | L4 | C(M5, W14, L4) = 30 |
| 13 | 32 | M5 | W14 | L4 | |
| 23 | 20 | M5 | W5 | L3 | C(M5, W5, L3) = 22 |
| 24 | 24 | M5 | W5 | L3 | |
| 26 | 28 | M5 | W18 | L2 | C(M5, W18, L2) = 30 |
| 27 | 32 | M5 | W18 | L2 | |
| 32 | 16 | M5 | W9 | L2 | C(M5, W9, L2) = 16 |

TABLE 6

| Time | Acoustic Feature Vector | Elementary Model | Word Segment Model | Location | Cluster Value |
| --- | --- | --- | --- | --- | --- |
| 9 | 44 | M9 | W14 | L2 | C(M9, W14, L2) = 46 |
| 10 | 48 | M9 | W14 | L2 | |
| 28 | 44 | M9 | W18 | L3 | C(M9, W18, L3) = 47 |
| 29 | 50 | M9 | W18 | L3 | |

TABLE 7

| Time | Acoustic Feature Vector | Elementary Model | Word Segment Model | Location | Cluster Value |
| --- | --- | --- | --- | --- | --- |
| 8 | 67 | M20 | W14 | L1 | C(M20, W14, L1) = 67 |
| 11 | 69 | M20 | W14 | L3 | C(M20, W14, L3) = 69 |
| 25 | 72 | M20 | W18 | L1 | C(M20, W18, L1) = 72 |
| 30 | 70 | M20 | W18 | L4 | C(M20, W18, L4) = 70 |

As shown in Table 3, in this hypothetical example, the feature vector signals are clustered into three clusters corresponding to the elementary model M1. The clusters C(M1,W1,L2) contains all of the feature vector signals corresponding to elementary model M1 in location L2 in word-segment model W1. The cluster C(M1,W5,L1) contains all of the acoustic feature vector signals corresponding to elementary model M1 in location L1 in word-segment model W5. The cluster C(M1,W9,L3) contains all of the acoustic feature vector signals corresponding to elementary model M1 in location L3 in word-segment model W9.

Also as shown in Table 3, cluster C(M1,W1,L2) has a cluster value equal to 9, which is the average of the feature values of all of the feature vectors in the cluster period. Cluster C(M1,W5,L1) has a cluster value equal to 8.67, which is the average of the feature values of all the feature vectors in that cluster. Cluster C(M1,W9,L3) has a cluster value equal to 9.5, which is the average of the feature values of all the feature vectors in that cluster.

Similarly, Table 4, 5, 6, and 7 show the clusters corresponding to the elementary models M4, M5, M9 and M20, respectively, and the cluster value of each cluster. In this hypothetical example, there are three clusters corresponding to elementary model M4, there are five clusters corresponding to elementary model M5, there are two clusters corresponding to elementary model M9, and there are four clusters corresponding to elementary model M20.

Referring back to FIG. 1, the apparatus for generating a set of acoustic prototype signals for encoding speech includes means for storing a plurality of prototype vector signals shown as revised prototype vector store 32. Each prototype vector signal corresponds to an elementary model, has an identifier, and comprises at least two partition values. At least one partition value is equal to a combination of the cluster values of one or more cluster signals corresponding to the elementary model. At least one other partition value is equal to a combination of the cluster value of one or more cluster signals corresponding to the elementary model.

Table 8 shows the prototype vector signals obtained in the hypothetical example of Tables 1-7.

TABLE 8

| Prototype Vector | Component Clusters | Partition Value | Partition Probability |
| --- | --- | --- | --- |
| P(M1) | {M1,W1,L2} + {M1,W5,L1} | 8.875 | $\frac{8}{34}$ |
| | {M1,W9,L3} | 9.5 | $\frac{2}{34}$ |
| P(M4) | {M4,W1,L3} + {M4,W5,L2} | 15.2 | $\frac{5}{34}$ |

TABLE 8-continued

| Prototype Vector | Component Clusters | Partition Value | Partition Probability |
|---|---|---|---|
| | {M4,W9,L1} | 14 | $\frac{1}{34}$ |
| P(M5) | {M5,W1,L1} + {M5,W9,L2} + {M5,W5,L3} | 20 | $\frac{6}{34}$ |
| | {M5,W14,L4} + {M5,W18,L2} | 30 | $\frac{4}{34}$ |
| P(M9) | {M9,W14,L2} | 46 | $\frac{2}{34}$ |
| | {M9,W18,L3} | 47 | $\frac{2}{34}$ |
| P(M20) | {M20,W14,L1} + {M20,W14,L3} | 68 | $\frac{2}{34}$ |
| | {M20,W18,L1} + {M20,W18,L4} | 71 | $\frac{2}{34}$ |

The prototype vector signal P(M1) corresponds to elementary model M1, has the identifier P(M1) and comprises two partition values, 8.875 and 9.5. The partition value 8.875 is equal to the average cluster value of the combined clusters {M1, W1, L2} and {M1, W5, L1}. The partition value of 9.5 is equal to the cluster value of the cluster {M1, W9, L3}.

Preferably, each partition value also includes a partition probability. As shown in Table 8, the partition probability is the probability of occurrence of an acoustic feature vector signal belonging to a component cluster of the partition. The partition probability is estimated from the acoustic feature vectors produced by the utterance of the training script, as shown in Table 2. Thus, of the 34 acoustic feature vectors produced by the utterance of the training script in this hypothetical example, 8 of the acoustic feature vectors are contained in clusters {M1, W1, L2} or {M1, W5, L1}. Therefore, the partition probability is 8/34.

Similarly, Table 8 shows the component clusters, the partition values, and the partition probabilities for prototype vectors P(M4), P(M5), P(M9), and P(M20), corresponding to elementary models M4, M5, M9 and M20, respectively, for this hypothetical example.

In the hypothetical example shown in Table 8, the selection of clusters to be combined to form partitions was made by manual inspection. Preferably, the selection of which clusters to merge is made by generating a clustering tree for each elementary model, and by then pruning the clustering tree by merging selected clusters on the clustering tree which branch from a common node, or by discarding selected clusters.

Preferably, the clustering tree for an elementary model is generated in the following way. For each pair of clusters for a given elementary model, calculate the Euclidean distance between the mean (average) of each cluster, and rank the resulting pairs of clusters from highest to lowest according to the Euclidean distance. For each of the K pairs of clusters corresponding to the K smallest Euclidean distances between the clusters in the pair, the mean value of the cluster pair is obtained. A reasonable choice for K is ten. For each of these K pairs of clusters, the Euclidean distance is obtained between the mean value of the cluster pair and the man value of each other signal cluster corresponding to the same elementary model to identify the associated single cluster closest to the pair of clusters. The pair of clusters whose combined mean value is farthest from the mean value of their associated single cluster are then merged into a new cluster.

The new cluster forms a node of a clustering tree, which node contains one branch to each of the component clusters of the merged cluster. After merging the two component clusters into the cluster, the number of clusters is reduced by one.

The process is then repeated for the reduced set of clusters corresponding to the same elementary model to form successive nodes and branches of a clustering tree. Each non-end node has exactly two branches. The process is repeated until the number of clusters is reduced to one.

The original clusters form end nodes (leaf clusters) in the clustering tree just obtained. Preferably, the clustering tree is pruned in the following way. For each leaf cluster, obtain the count of acoustic feature vector signals corresponding to the leaf cluster. If the count is less than a selected minimum count, then do one of the following. If the leaf cluster is one of only two leaf clusters extending from a common node of the clustering tree, then merge the leaf cluster into the other leaf cluster of the common node, so the common node becomes an end node.

If the leaf cluster is one of more than two leaf clusters extending from the nearest common node, then obtain the count of acoustic feature vectors from the other node branching from the nearest common node of the clustering tree. If the count of acoustic feature vectors corresponding to the leaf cluster divided by the count of acoustic feature vectors corresponding to the nearest node cluster is less than a selected minimum ratio, then discard the leaf cluster. Adequate choices for the minimum count and the minimum ratio are, for example, 10 and 0.1, respectively.

For each pair of remaining leaf clusters T and T' in the pruned clustering tree, for each parent node P, compute the quantity $$V(P) = [C_T M_T^2 + C_T M_{T'}^2] - \frac{1}{C_P} [C_T M_T + C_T M_{T'}]^2 \qquad (1)$$

In equation (1), $C_T$ is the count of acoustic feature vectors corresponding to cluster T, $M_T$ is the mean value of the acoustic feature vectors corresponding to cluster T, and $C_P$ is the count of acoustic feature vectors corresponding to all of the clusters which branch directly from node P. The quantity V(P) is the increase in deviation which would result from merging cluster T and cluster T'. The pair of leaf clusters having the smallest increase in deviation are merged into one merged leaf cluster, reducing the number of remaining leaf clusters by one. The process is repeated on the remaining leaf clusters until the number of leaf clusters in the clustering tree falls below a selected threshold Q. A reasonable upper bound for the threshold Q is 20.

In the clustering tree, each node corresponds to one or more clusters, and therefore corresponds to a single elementary model in a single location in a single word-segment model. Consequently, if the clustering tree in generated from a large amount of data (for example, a large training script, a large number of utterances of the training script, and/or a large number of speakers), then the one clustering tree can be used for all speakers. In this way, the time required to generate a clustering tree for each new speaker is avoided.

However, while it is possible to use a single clustering tree for all new speakers, the pruning of the clustering tree must be performed for each individual new speaker in the manner described above.

FIG. 1 also shows an example of a speech recognition apparatus according to the present invention. The speech recognition apparatus comprises means for measuring the value of at least one feature of an utterance of a word to be recognized during each of a series of time intervals spanned by the utterance of the word to be recognized to produce a series of feature vector signals. Each feature vector signal represents the value of the at least one feature of the utterance during a corresponding time interval. As discussed above, the means for measuring the value of at least one feature of an utterance may comprise microphone 12, analog to digital converter 14, window generator 16, and spectrum analyzer 18.

The speech recognition apparatus further comprises means for storing a set of a plurality of prototype vector signals. Each prototype vector signal has an identifier and a prototype value. The prototype vector store may comprise the active prototype vector store 22 loaded with the revised prototype vectors from block 32.

The speech recognition apparatus also contains means for comparing the value of each feature vector signal to the value of each prototype vector signal to identify the best matched prototype vector signals associated with each feature vector signal to produce a series of associated prototype vector identifier signals. The means for comparing feature vector signals and prototype vector signals may comprise the labeller 24 described previously.

In order to identify utterances, the speech recognition apparatus includes means for storing a plurality of acoustic word models. The acoustic word model store may comprise active acoustic model store 28 loaded with word models from store 34. Means are then provided for comparing the series of prototype identifier signals with each of the acoustic word models to estimate the one or more words which most likely correspond to the series of prototype vector identifier signals. The means for comparing the series of prototype vector identifier signals with the acoustic word models may comprise the acoustic match processor 26, described above. For the purpose of estimating the most likely words, acoustic match processor 26 preferably estimates each word likelihood on many possible paths through the word model, as described in the article by F. Jelinek, above.

The speech recognition apparatus further contains a display 36 for displaying at least one of the one or more words while most likely correspond to the series of prototype vector identifier signals. The display 36 may be, for example, am temporary image of the word generated on a display screen, or a permanent image of the word printed on paper or some other medium.

Finally, according to the invention, the speech recognition apparatus further comprises means for generating the set of acoustic prototype vector signals, each having at least two partition values, as previously described.

Preferably, the value of a feature vector signal is compared to the value of a prototype signal to produce a prototype match score. More specifically, the value of the feature vector signal is compared to the value of each partition (sub-prototype vector) of a prototype vector signal to produce a partition match score for each partition. The prototype match score may be either (a) the best partition match score (preferred), or (b) a combination of all of the partition match scores for the prototype vector signal.

Preferably, all of the elements of the apparatus for generating a set of acoustic prototype signals for encoding speech, and all of the elements of the speech recognition apparatus shown in FIG. 1, except for the microphone 12, the analog to digital converter 14, and the display 36, comprise a suitably programmed general purpose digital computer system.

The invention is also an apparatus for configuring a machine to perform the method of generating a set of acoustic prototype signals for encoding speech, as described above. For a machine comprising a general purpose digital computer system containing a microphone 12, an analog to digital converter 14 and a display 36 in the manner shown in FIG. 1, the apparatus for configuring the machine to perform the method of generating a set of acoustic prototype signals for encoding speech comprises a recording medium, such as a diskette having a magnetic coating thereon, on which a suitable computer program is recorded.

We claim:

1. An apparatus for generating a set of acoustic prototype signals for encoding speech, said apparatus comprising:

means for storing a model of a training script, said training script model comprising a series of word-segment models, each word-segment model being selected from a finite set of word-segment models, each word-segment model comprising a series of elementary models, each elementary model having a location in each word-segment model, each elementary model being selected from a finite set of elementary models;

means for measuring the value of at least one feature of an utterance of the training script during each of a series of time intervals spanned by the utterance of the training script to produce a series of feature vector signals, each feature vector signal having a feature value representing the value of the at least one feature of the utterance during a corresponding time interval;

means for estimating at least one path through the training script model which would produce the entire series of measured feature vector signals so as to estimate, for each feature vector signal, the corresponding elementary model in the training script model which would produce that feature vector signal;

means for clustering the feature vector signals into a plurality of clusters to form a plurality of cluster signals, each feature vector signal in a cluster corresponding to a single elementary model in a single location in a single word-segment model, each cluster signal having a cluster value equal to an average of the feature values of all of the feature vector signals in the cluster;

means for storing a plurality of prototype vector signals, each prototype vector signal corresponding to an elementary model, each prototype vector signal having an identifier and comprising at least two partition values, at least one partition value being equal to a combination of the cluster values of one or more cluster signals corresponding to the elementary model, at least one other partition value being equal to a combination of the cluster values of one or more other cluster signals corresponding to the elementary model.

2. An apparatus as claimed in claim 1, characterized in that the estimating means comprises means for estimating the most likely path through the training script model which would produce the entire series of measured feature vector signal so as to estimate, for each feature vector signal, the corresponding elementary model in the training script model which would most likely produce that feature vector signal.

3. An apparatus as claimed in claim 2, characterized in that at least two different word-segment models contain at least a first elementary model.

4. An apparatus as claimed in claim 3, characterized in that at least one word-segment model contains a first elementary model in at least two different locations in the word-segment model.

5. An apparatus as claimed in claim 4, characterized in that each cluster signal has a cluster value equal to the average of the feature values of all of the feature vectors in the cluster, and equal to the variance of the feature values of all of the feature vectors in the cluster.

6. A method of generating a set of acoustic prototype signals for encoding speech, said method comprising the steps of:
storing a model of a training script, said training script model comprising a series of word-segment models, each word-segment model being selected from a finite set of word-segment models, each word-segment model comprising a series of elementary models, each elementary model having a location in each word-segment model, each elementary model being selected from a finite set of elementary models;
measuring the value of at least one feature of an utterance of the training script during each of a series of time intervals spanned by the utterance of the training script to produce a series of feature vector signals, each feature vector signal having a feature value representing the value of the at least one feature of the utterance during a corresponding time interval;
estimating at least one path through the training script model which would produce the entire series of measured feature vector signals so as to estimate, for each feature vector signal, the corresponding elementary model in the training script model which would product that feature vector signal;
clustering the feature vector signals into a plurality of clusters to form a plurality of cluster signals, each feature vector signal in a cluster corresponding to a single elementary model in a single location in a single word-segment mode, each cluster signal having a cluster value equal to an average of the feature values of all of the feature vector signals in the cluster;
storing a plurality of prototype vector signals, each prototype vector signal corresponding to an elementary model, each prototype vector signal having an identifier and comprising at least two partition values, at least one partition value being equal to a combination of the cluster values of one or more cluster signals corresponding to the elementary model, at least one other partition value being equal to a combination of the cluster values of one or more other cluster signals corresponding to the elementary model.

7. A method as claimed in claim 6, characterized in that the step of estimating comprises estimating the most likely path through the training script model which would produce the entire series of measured feature vector signals so as to estimate, for each feature vector signal, the corresponding elementary model in the training script model which would most likely produce that feature vector signal.

8. A method as claimed in claim 7, characterized in that at least two different word-segment models contain at least a first elementary model.

9. A method as claimed in claim 8, characterized in that at least one word-segment model contains a first elementary model in at least two different locations in the word-segment model.

10. A method as claimed in claim 9, characterized in that each cluster signal has a cluster value equal to the average of the feature values of all of the feature values of all of the feature vectors in the cluster.

11. A speech recognition apparatus comprising:
means for measuring the value of at least one feature of an utterance of a word to be recognized during each of a series of time intervals spanned by the utterance of the word to be recognized to produce a series of feature vector signals, each feature vector signal having a feature value representing the value of at least one feature of the utterance during a corresponding time interval;
means for storing a set of a plurality of prototype vector signals, each prototype vector signal having an identifier and a prototype value;
means for comparing the value of each feature vector signal to the prototype value of each prototype vector signal to identify the best matched prototype vector signal associated with each feature vector signal to produce a series of associated prototype vector identifier signals;
means for storing a plurality of acoustic word models;
means for comparing the series of associated prototype vector identifier signals with each of the acoustic word models to estimate the one or more words which most likely correspond to the series of associated prototype vector identifier signals; and
a display for displaying at least one of the one or more words which most likely correspond to the series of associated prototype vector identifier signals;
characterized in that the apparatus further comprises means for generating the set of prototype vector signals, said means for generating comprising:
means for storing a model of a training script, said training script model comprising a series of word-segment models, each word-segment model being selected from a finite set of word-segment models, each word-segment model comprising a series of elementary models, each elementary model having a location in each word-segment model, each elementary model being selected from a finite set of elementary models;
means for measuring the value of at least one featuyre of an utterance of the training script during each of a series of time intervals spanned by the utterance of the training script to produce a series of feature vector signals, each feature vector signal having a feature value representing the value of the at least one feature of the utterance during a corresponding time interval;

means for estimating at least one path through the training script model which would produce the entire series of measured feature vector signals so as to estimate, for each feature vector signal, the corresponding elementary model in the training script model which would produce that feature vector signal;

means for clustering the feature vector signals into a plurality of clusters to form a plurality of cluster signals, each feature vector signal in a cluster corresponding to a single elementary model in a single location in a single word-segment model, each cluster signal having a cluster value equal to an average of the feature values of all of the feature vector signals in the cluster;

means for storing a plurality of prototype vector signals, each prototype vector signal corresponding to an elementary model, each prototype vector signal having an identifier and comprising at least two partition values, at least one partition value being equal to a combination of the cluster values of one or more cluster signals corresponding to the elementary model, at least one other partition value being equal to a combination of the cluster values of one or more other cluster signals corresponding to the elementary model.

12. An apparatus as claimed in claim 11, characterized in that the estimating means comprises means for estimating the most likely path through the training script model which would produce the entire series of measured feature vector signals so as to estimate, for each feature vector signal, the corresponding elementary model in the training script model which would most likely produce that feature vector signal.

13. An apparatus as claimed in claim 11, characterized in that the means for comparing the value of each feature vector signal to the value of each prototype vector signal comprises:

means for comparing the value of each feature vector signal to the value of each partition of a prototype vector signal to produce a partition match score for each partition; and selecting the best partition match score for a prototype vector signal as a prototype match score for that prototype vector signal.

14. An apparatus as claimed in claim 11, characterized in that the means for comparing the value of each feature vector signal to the value of each prototype vector signal comprises:

means for comparing the value of each feature vector signal to the value of each partition of a prototype vector signal to produce a partition match score for each partition; and combining the partition match scores for a prototype vector signal to produce a prototype match score for that prototype vector signal.

* * * * *